US010402863B2

(12) United States Patent
Keller et al.

(10) Patent No.: US 10,402,863 B2
(45) Date of Patent: Sep. 3, 2019

(54) USABILITY OF SUPPLEMENTAL APPLICATION FUNCTIONS THROUGH DYNAMIC MODIFICATION OF USER-PRESENTED OPTIONS

(71) Applicant: Microsoft Corporation, Redmond, WA (US)

(72) Inventors: Donald Keller, Kirkland, WA (US); Jonathan Winslow Anderson, Seattle, WA (US); Pedro Emilio Gutierrez, Jr., Redmond, WA (US); Diana Finster, Seattle, WA (US); Enrique de la Garza, Sammamish, WA (US); Kenneth Alan Lobb, Redmond, WA (US); Alexei Pineda, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1086 days.

(21) Appl. No.: 14/506,586

(22) Filed: Oct. 3, 2014

(65) Prior Publication Data

US 2016/0098760 A1 Apr. 7, 2016

(51) Int. Cl.
*G06Q 30/00* (2012.01)
*G06Q 30/02* (2012.01)
*G06F 3/0482* (2013.01)

(52) U.S. Cl.
CPC ....... *G06Q 30/0269* (2013.01); *G06F 3/0482* (2013.01); *G06Q 30/0206* (2013.01); *G06Q 30/0247* (2013.01); *G06Q 30/0251* (2013.01)

(58) Field of Classification Search
None
See application file for complete search history.

(56) References Cited

U.S. PATENT DOCUMENTS 8,491,380 B2 7/2013 Mosites et al.
2007/0015569 A1 1/2007 Norton et al.
(Continued)

OTHER PUBLICATIONS

"Value Exchange Advertising in Freemium Games", In White Paper HIS Technology, Mar. 2014, 11 pages.
(Continued)

*Primary Examiner* — Alvin L Brown
(74) *Attorney, Agent, or Firm* — Watson Patents, PLC; Vladan M. Vasiljevic

(57) ABSTRACT

A function intelligence engine receives input regarding application program content, including functions or capabilities of the application program that can be separately purchasable, and can further receive information regarding advertisements that can be displayed to users within the context of the application program. User-specific information is also received, including a user's current status and context within the application program, as well as a user's history, both within the application program, as well as in other application programs. Based on such information, the function intelligence engine determines and compares the probability of a user purchasing, versus the probability of the user consuming advertising, to acquire the separately purchasable function. The function intelligence engine then generates, and presents to the user, options that increase the chances of the user obtaining the separately purchasable function and maximize the benefit received by an application program author for providing the separately purchasable function.

20 Claims, 5 Drawing Sheets

(56) References Cited

U.S. PATENT DOCUMENTS

| | | | |
|---|---|---|---|
| 2007/0234213 | A1 | 10/2007 | Krikorian et al. |
| 2009/0037575 | A1* | 2/2009 | Crystal .................. G06Q 30/02 709/224 |
| 2011/0159964 | A1 | 6/2011 | Schiappa et al. |
| 2011/0264528 | A1* | 10/2011 | Whale .................... G06Q 30/02 705/14.58 |
| 2011/0288941 | A1 | 11/2011 | Chandra et al. |
| 2012/0047017 | A1 | 2/2012 | Hernandez et al. |
| 2013/0006743 | A1 | 1/2013 | Moore et al. |
| 2013/0053141 | A1 | 2/2013 | Guerin et al. |
| 2013/0103481 | A1 | 4/2013 | Carpenter et al. |
| 2013/0138507 | A1* | 5/2013 | Kumar ............... G06Q 30/0251 705/14.54 |
| 2014/0073420 | A1 | 3/2014 | Downing |
| 2018/0082524 | A1* | 3/2018 | Bytnar ................ G07F 17/3209 |

OTHER PUBLICATIONS

Wang, et al., "Game Reward Systems: Gaming Experiences and Social Meanings", In Proceedings of DiGRA Conference: Think Design Play, Jan. 2011, 15 pages.

"Virtual currency", Published on: Feb. 8, 2014, Available at: http://www.matomy.com/offer-wall.

Koetsier, John, "Mediabrix' in-Game Ads are Generating $200 CPMs—180 Times More Than Traditional Ads", Published on: Dec. 20, 2012, Available at: http://venturebeat.com/2013/12/20/mediabrix-in-game-ads-are-generating-200-cpms-180x-more-than-traditional-ads/.

"Second Written Opinion Issued in PCT Application No. PCT/US2015/053381", dated May 19, 2016, 6 Pages.

"International Search Report and Written Opinion Issued in PCT Application No. PCT/US2015/053381", dated Nov. 25, 2015, 11 Pages.

* cited by examiner

USABILITY OF SUPPLEMENTAL APPLICATION FUNCTIONS THROUGH DYNAMIC MODIFICATION OF USER-PRESENTED OPTIONS

BACKGROUND

Much of the content that is consumed by individuals is supported, at least in part, through advertising revenue. For example, network television shows, and, even prior to that, radio broadcasts, were funded through the sale of advertising wherein advertisers paid for the right to present advertisements to the audience of such shows and broadcasts. As another example, print media, such as magazines and newspapers, are paid by advertisers to include printed advertisements, with such advertiser payments reducing the amount subscribers of such print media would otherwise have to pay to access the content printed thereon.

Computer application programs can also be supported through advertising revenue. For example, computer application programs can be distributed by their authors without charge to users. As part of such application programs, however, users can be presented with advertisements, and the authors of such application programs can be compensated, by advertisers, for the display of such advertisements, thereby receiving compensation for their efforts in creating or improving the application programs without directly charging users to utilize such application programs.

Some application programs contain supplemental application functions that can be purchased separately from the application program itself. For example, a computer application program directed to creating computer-generated music can comprise a default set of instruments, with additional instruments being purchasable separately from the music computer application program. As another example, a drawing computer application program can comprise a default set of filters to be applied to images, with additional filters being separately purchasable from the drawing computer application program itself.

SUMMARY

A function intelligence engine can receive input regarding an application program's content, including functions or capabilities of the application program that can be separately purchasable, and can further receive information regarding advertisements that can be displayed to users within the context of the application program. Utilizing such information, in combination with user-specific information, the function intelligence engine can select and present to users options for acquiring separately purchasable application functions, where such user-presented options optimize the benefit that is received by an application program author from their application program. User-specific information can include a user's current status and context within the application program, as well as a user's history, both within the application program, as well as in other application programs. Based on such user-specific information, the function intelligence engine can determine and compare the probability of a user purchasing a separately purchasable function versus the probability of the user consuming advertising to offset the cost of the separately purchasable function, and can also determine and compare the expected benefits, to an application program author, of either approach. The function intelligence engine can then generate, and present to the user options that increase the chances of the user obtaining the separately purchasable function and maximize the benefit received by an application program author for the provision of such a separately purchasable function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
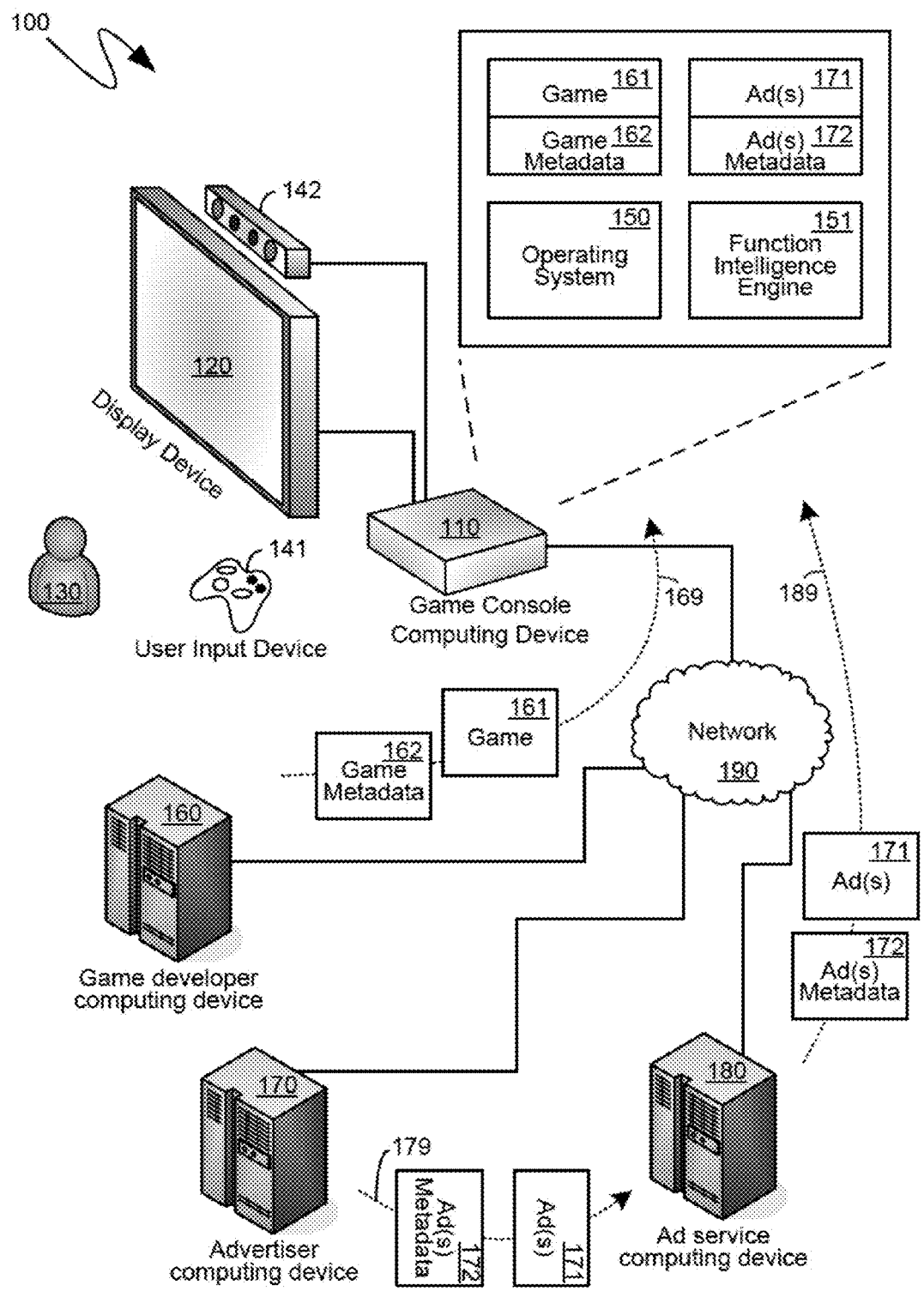
FIG. 1 is a block diagram of an exemplary system within whose context the usability of separately purchasable application functions can be improved by dynamically modifying the user presented options for obtaining such functions.

The following description relates to improving the usability and accessibility of supplemental functions in a computer application program that are independently acquirable from the computer application program itself. Such supplemental functions provide access to capabilities or services that were otherwise unavailable to the user of such an application program, and are typically made available to a user of the computer application program after the user has already started utilizing the application program. Existing mechanisms for providing access to such supplemental functions are not tailored to individual users and, consequently, make user access to such supplemental functions more difficult. By contrast, a function intelligence engine, such as that described in detail below, can customize, for each specific user, the manner in which such a user acquires access to such supplemental functions, thereby improving the usability and accessibility of such supplemental functions.

More specifically, the function intelligence engine can receive input regarding application program content and can further receive information regarding advertisements that can be displayed to users within the context of the application program. Utilizing such information, in combination with user-specific information, the function intelligence engine can select and present user-tailored options for acquiring separately purchasable application functions, where such options also optimize the benefit that is received by an application program author from their application program. User-specific information can include a user's current status and context within the application program, as well as a user's history, both within the application program, as well as in other application programs. Based on such user-specific information, the function intelligence engine can determine and compare the probability of a user purchasing a separately purchasable function versus the probability of the user consuming advertising to offset the cost of the separately purchasable function, and can also determine and compare the expected benefits, to an application program author, of either approach. The function intelligence engine can then generate, and present to the user options that increase the chances of the user obtaining the separately purchasable function and maximize the benefit received by an application program author for the provision of such a separately purchasable function The techniques described herein are presented with a focus on video game application programs executed by a computing device that can be a dedicated game console computing device or a general-purpose computing device, including portable and tablet variants thereof. However, such descriptions are not meant to suggest a limitation of the described techniques to specifically the videogame arts. To the contrary, as exemplified by the general description already provided, the described techniques are equally applicable to any environment in which an application program, executable by a computing device comprising one or more processing units, can make available to the user separately obtainable supplemental functions that provide additional capabilities, services or functionality beyond that provided by the application program without such supplemental functions.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other devices capable of executing the computer-executable instructions in the manner intended to produce the desired results, including handheld devices, multi-processor systems, microprocessor based or programmable consumer electronics, network PCs, minicomputers, mainframe computers, video game consoles, digital video recorders, audio and/or video content presentation devices and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and other like hardware logic components and devices.

Turning to FIG. 1, an exemplary system 100 is illustrated, providing context for the descriptions below. As illustrated in FIG. 1, the exemplary system 100 can comprise a game console computing device 110 that can be communicationally coupled to a physical display device 120. The physical display device 120 can be any type of display device that can generate a viewable physical image, including Liquid Crystal Display (LCD) devices, plasma-based devices, Organic Light Emitting Diode (OLED) devices, phosphorus-based devices, and other like display devices. As will be recognized by those skilled in the art, such display devices generate images through the manipulation of discrete, physical elements that, in aggregate, comprise the image being presented by the display device. For example, an LCD-based device generates images through the physical orientation of individual, physical liquid crystals, which, in aggregate, form the image being presented by the LCD-based device.

The game console computing device 110 can be any device having sufficient processing capability to execute the computer-executable instructions, and perform the steps, described herein. Additionally, while it is illustrated as a game console computing device 110 in the exemplary system 100 of FIG. 1, the descriptions below are equally applicable to any form of computing device on which application programs can be executed, where such application programs have separately-acquirable supplemental functions. Consequently, reference to the game console computing device 110 are meant to equally reference any computing device such as, for example, desktop computing devices, laptop computing devices, tablet computing devices, smartphone computing devices, and dedicated purpose computing devices, such as, for example, digital video recorders, digital media streaming devices, and other like dedicated purpose computing devices.

The game console computing device 110 can comprise sufficient hardware and software capability to control a display device, such as the display device 120, in order to cause the display device 120 to generate images thereon. One or more users, such as the exemplary user 130, can utilize the game console computing device 110 to interact with the application program content displayed by the game console computing device 110 via the physical display device 120. The user 130 can interface with the game console computing device 110 through various user input devices including, for example, a video game controller 141, an audio/visual input device 142, as well as more traditional computer input devices, such as a trackpad, a mouse, keyboard, and other like user input devices that are not specifically illustrated in the exemplary system 100 of FIG. 1. As will be recognized by those skilled in the art, the audio/visual input device 142 can comprise sensors by which the physical appearance and physical movements of the user, as well as audio generated by the user, can be utilized to provide user input, such as to the game console computing device 110.

The game console computing device 110 can execute an operating system, such as the exemplary operating system 150 that can provide mechanisms by which other application programs can be executed by the game console computing device 110, and can enable such other application programs to access the hardware of the game console computing device 110. Additionally, the game console computing device 110 can execute a game, such as the exemplary game 161, that can cause the game console computing device 110 to physically generate graphical output on the display device 120, in response to which the user 130 can generate user input, such as through the aforementioned user input devices, and thereby interact with the exemplary game 161. As in the case of the game consul computing device 110, described in detail above, reference herein to a "game", such as the exemplary game 161, includes any application program, executable by a computing device, with which a user can interact through the provision of user input and the consumption of output generated by such an application program, such as graphical output physically generated on a physical display device.

As described above, application programs can offer separately-acquirable supplemental functions that can provide capabilities, services or functionality that differs from, or expands upon, that already offered by the application program itself without such supplemental functions. For example, within a gaming context, the game 161 can offer separately-acquirable supplemental functions in the form of extra character lives, additional character abilities, supplemental points, different game levels or aspects, devices within the context of the game, such as weapons, vehicles, tools, clothing, artifacts and currency, and other like supplemental functions. Such separately-acquirable supplemental functions are made available to the user, such as the exemplary user 130, shown in FIG. 1, through an interface presented by the game console computing device 110 via the display device 120, as part of the device's execution of the game 161. Typically, such separately-acquirable supplemental functions are acquirable by a user through a purchase in which the user provides currency, to a game developer, in exchange for receiving such a separately-acquirable supplemental function. Such a purchase can be separate from the purchase of the application program, such as the exemplary game 161, itself. Indeed, as will be recognized by those skilled in the art, game developers, and other authors of computer program applications, can utilize a "freemium" model in which the games, or other computer program applications, are given away for free, and compensation is received by such authors, not from the initial purchase of such applications, but rather from the subsequent purchases of separately-acquirable supplemental functions.

As will also be recognized by those skilled in the art, computer application programs, including gaming computer application programs, have been distributed utilizing an advertising supported model, where the computer application programs are, again, distributed to users for free, except that, as part of the user's utilization of such programs, advertisements are displayed to the user, and the authors of such application programs receive compensation from advertisers in exchange for facilitating the display of such advertisements through their application programs.

From the user's perspective, the inflexibility inherent in the above-described monetization models decreases the usability of such application programs and makes the user's perception of such application programs less favorable. For example, such models represent a one-size-fits-all approach by which all users are afforded the same option to, for example, purchase a separately-acquirable supplemental function. But not all users value the separately-acquirable supplemental function in the same manner and, indeed, the value perception proposition for even a single user can change over the course of the user's utilization of the application program. Additionally, some users may be more disposed to consuming advertising, or other supplementally presented content, rather than forgoing monetary resources to acquire supplemental functions.

Similarly, from the perspective of an author or developer of a computer application program, freemium models and advertising supported models are based on a desire, by such an author or developer, to receive compensation for their efforts in creating the computer application program. As such, the inflexibility described above can result in reduced, or sub optimal, compensation.

To improve the usability and accessibility of separately-acquirable supplemental application functions, according to one aspect, the game console computing device 110 can further execute a function intelligence engine 151 that can interface with an application program, such as the exemplary game 161, and can generate and present to users of such an application program, such as the exemplary user 130, dynamically modified options, for acquiring supplemental application functions, that are tailored to the specific user to whom they are presented. In such a manner, the function intelligence engine 151 can improve the usability and accessibility of such separately-acquirable supplemental functions, as well as optimizing the monetization of corresponding application programs by their respective authors and developers.

The function intelligence engine 151 can communicate with the game 161 to receive information therefrom, including game metadata, such as the exemplary game metadata 162, that can provide user-independent information about the game 161, including enumerating at least some of the supplemental functions available within the context of the game 161, as well as other game metadata such as, for example, an identification of the various levels or scenes of the game, identification of the various goals or character achievements within the game, and the like. Additionally, the function intelligence engine 151 can receive user-specific information that can comprise a current status of the user, such as within the context of the game 161, a prior history of the user, such as whether the user has previously purchased supplemental functions that have been made available through the game 161, and other like user-specific information.

To obtain such user-specific information, users, such as the exemplary user 130, can be invited to provide, or allow access to, certain personal information that can improve the users' usability and accessibility of supplemental application functions. To protect users' privacy, users would be required to take one or more affirmative actions before their personal information could be collected, and, in the absence of such affirmative action, their personal information would not be collected. From the users' perspective, there can be meaningful benefits to allowing access to some discrete portion of their personal information. For example, such users may allow access to personal information because they wish to obtain access to the improved usability and accessibility of supplemental application functions, such as will be described in detail below. As another example, users can be provided with further services, or benefits, in exchange for providing, or allowing access to, some of their personal information. As yet another example, users can be compensated, either monetarily or through products and services, in exchange for providing, or allowing access to, some of their personal information.

In addition to the game metadata 162 and user-specific information, the function intelligence engine 151 can further receive input regarding one or more advertisements, such as the exemplary advertisements 171, so as to inform the usability and accessibility options presented by the function intelligence engine 151. More specifically, the function intelligence engine 151 can receive advertisement metadata, such as exemplary advertisement metadata 172, that can provide information regarding advertisements, such as exemplary advertisements 171, including, for example, information regarding a monetary value of the display of such advertisements, such as to an application program developer or author, a desired target audience for such advertisements, a product or category to which such advertisements are directed to, whether or not such advertisements are targeted to the user, such as exemplary user 130, and other like metadata.

Before proceeding with the description of the function intelligence engine 151, reference is made to the exemplary network 190, shown in FIG. 1, to which the game console computing device 110 can be communicationally coupled. In addition to the game console computing device 110, other computing devices can likewise be communicationally coupled to the network 190, enabling communications between such computing devices. Thus, also communicationally coupled to the network 190 can be an exemplary game developer computing device 160, an exemplary advertiser computing device 170, and an exemplary advertising service computing device 180.

The exemplary game developer computing device 160 can provide, such as is illustrated by the exemplary communication 169, the game 161, and the corresponding game metadata 162, to the game console computing device. For example, a user, such as exemplary user 130, can download the game 161 from the game developer computing device 160 to the game counsel computing device 110. As another example, such a user can obtain the game 161 from an online marketplace, game store, or other like intermediary to whom the game developer provided the game 161. Consequently, the exemplary communication 169 is meant to represent any one or more communications by which an application program, such as the exemplary game 161, is transferred from a computing device associated with the author of such an application program to a computing device on which such an application program will execute and be utilized by a user.

In an analogous manner, the exemplary advertiser computing device 170 can provide, such as via the communication 179, one or more advertisements, such as the exemplary advertisements 171, and associated advertisement metadata, such as the exemplary advertisement metadata 172, to an advertising service computing device, such as the exemplary advertising service computing device 180. The advertising service computing device 180 can then provide specific ones of the advertisements 171, and associated metadata 172, to the game console computing device 110, as illustrated by the exemplary communication 189. The provision, by the advertising service computing device 180, of at least some of the advertisements 171, and associated metadata 172, can be in response to specific requests from the game counsel computing device 110, or can be to supply a local cache of advertisements, from which advertisements to be displayed to the user 130 can be selected. As described above in reference to exemplary communication 169, exemplary communications 179 and 189 can, likewise, comprise one or more communications by which such advertisements are, either directly or indirectly, communicated among the exemplary computing devices illustrated.

Figure 2:
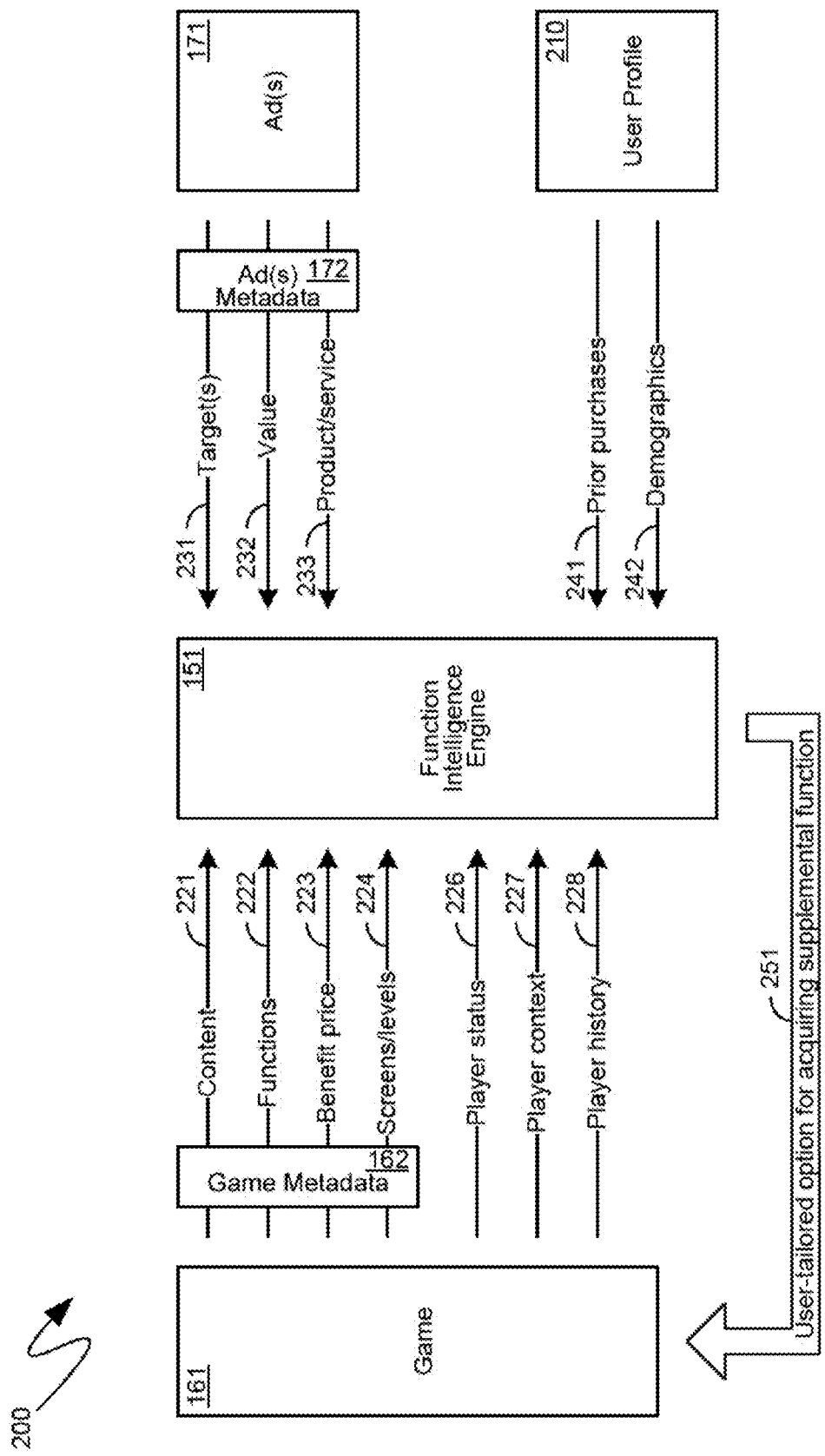
FIG. 2 is a block diagram of an exemplary system for improving the usability of separately purchasable application functions by dynamically modifying the user presented options for obtaining such functions.

Turning to FIG. 2, the exemplary system 200 shown therein illustrates an aspect operation of the above-described function intelligence engine 151. The function intelligence engine 151, as illustrated in FIG. 2, can provide, to an application program, such as the exemplary game 161, options that can be presented to a user to enable the user to acquire supplemental functions of an application program, such as in the form of the user-tailored option 251. More specifically, the function intelligence engine 151 can identify options for obtaining supplemental functions, and can then present such options to the user, where the presented options are tailored to the specific user, and their specific context, such as within the game 161, and which also seek to optimize the compensation received by an application program author, such as a developer of the game 161, in exchange for providing the user with such supplemental functionality.

As a simple example, a separately-acquirable supplemental function can be initially priced by an application author at $1.99. While some users may be willing to acquire such a supplemental function for $1.99, other users may seek to avoid spending the additional money. Such users may, however, be willing to receive the supplemental function in exchange for consuming advertising such as, for example, viewing a fifteen second video advertisement. In such a simple example, the function intelligence engine 151 can identify those users that, to the extent that they would wish to have access to the supplemental function in the first place, would be willing to spend $1.99 to obtain it, and can provide, to such users, an option to obtain such a supplemental function for $1.99. The function intelligence engine 151 can further identify those users that, to the extent that they would wish to have access to the supplemental function, would be willing to consume advertising to obtain access to such a supplemental function but would not otherwise be willing to spend $1.99, and the function intelligence engine 151 can provide, to such users, an option, not to purchase the supplemental function for $1.99, but rather to receive it in exchange for consuming advertising. In such a manner, an author of such an application program can receive, not only a benefit from those users that purchased the supplemental function, but also from an advertiser who can compensate the author of such an application program for the display of advertisements to other users from whom the application program author would not otherwise have received any benefit. The author of such an application program can, thereby, optimize the benefits received through the application program, while, simultaneously, a greater quantity of users can receive access to a supplemental function that can be desirable to such users, and can improve the usability of such an application program.

Additionally, the function intelligence engine 151 can take into account the user's current status and context within an application program and can tailor the options presented to such a user accordingly. For example, returning to the above simple example, a user playing a videogame that is stuck on a particular level may be more eager to receive access to a supplemental function that can aid the user in advancing beyond such a level then a user that has already advanced beyond that level and, consequently, may not have a greater need for such a supplemental function. In such a simple example, the function intelligence engine 151 can generate and present, to such a user, an option for obtaining the supplemental function for $1.99, even if the function intelligence engine 151 had previously generated and presented, to such a user, an option for obtaining the supplemental function in exchange for consuming advertising. As yet another example, a user interacting with an application program can be identified as one of a target audience that can be particularly valuable to a specific advertiser. For example, a user engaged in a videogame over a period of time that stretched across common dinner times can be particularly valuable to, for example, businesses that provide prepared food delivery services. In such an instance, the function intelligence engine 151 can generate and present, to such a user, an option for obtaining a supplemental function that, previously, the user may have only been offered to purchase for $1.99, but now can be offered to receive such a supplemental function in exchange for consuming advertising from, for example, a business that provides prepared food delivery services. In such an example, an application author can receive greater value from an advertiser than the value that the application author would have received had the user simply purchased the supplemental function.

Turning back to the exemplary system 200 of FIG. 2, according to one aspect, the function intelligence engine 151 can collect, or obtain, information on which the function intelligence engine 151 can base the user-tailored option 251 that it generates and presents to a user to improve such a user's obtaining and utilizing of supplemental application functions. As indicated previously, from an application program, such as the exemplary game 161, the function intelligence engine 151 can receive game metadata, such as exemplary game metadata 162. As illustrated in the exemplary system 200 of FIG. 2, game metadata, such as the exemplary game metadata 162, can comprise information about the game that is specific to the game itself, and is typically not dependent upon any specific user. Such user-independent game information can include information regarding the content 221 of the game 161, which can include information identifying goals of the game, points or scorekeeping structure within the game, limitations or boundaries within the game, and other like content. Game metadata 162 can also include functions 222, which can identify functionality already present within the game 161, supplemental functions that a user can separately acquire through the game 161, and combinations thereof. The pricing 223 of the supplemental functions, and other like additional, separately-acquirable benefits can also be provided to the function intelligence engine 151. Additionally, game metadata 162 can include level 224 information detailing various game levels, screens, playing fields, environments, contexts and the like.

In addition to user independent game data, such as the game metadata 162, the function intelligence engine 151 can receive user-specific information from the game 161. As indicated previously, such user-specific information can be received only if the user has explicitly authorized the provision of their information to, for example, function intelligence engine 151, or associated services. Such user-specific information can include information regarding the status 226 of the user including, for example, whether the user's character is hurt, what percentage of a level the user has completed, how many life points a user has, which tools, weapons or powers the user's character currently possesses, and other like status information. User-specific information can also include information regarding the context 227 of a user, which can identify how many levels a user has completed, how many opponents a user has captured, how many awards a user has received, how many goals the user has obtained, how long the user has been interacting with the game 161, and other like contextual information. While the player status 226 and context 227 can be unique to a specific interactive instance or gaming session, user-specific information can also include historical information which can identify, for example, whether the user has previously purchased any supplemental functions through the game 161, whether the user purchased the game 161 or is interacting with a free version that offers reduced functionality, and other like historical information.

In addition to user-specific information that can be received from an application program, such as the exemplary game 161, function intelligence engine 151 can also receive user-specific information from other sources such as, for example, a user profile, which can be maintained independently of an application program. For example, the exemplary system 200 of FIG. 2 illustrates an exemplary user profile 210, which can be maintained by processes executing on the same computing device as the function intelligence engine 151 and the game 161, or can be maintained independently, such as via a network-based, or "cloud-based", service hosted by multiple computing devices located remotely from the computing device on which the function intelligence engine 151 is executing. From such a user profile 210, function intelligence engine 151 can obtain information regarding the user's prior purchases 241, or other like behavior within the context of other application programs independent from the game 161. For example, the prior purchases 241 can reveal that the user has never purchased separately-acquirable supplemental functions for any other application program with which the user has interacted, or which the user has purchased. Alternatively, as another example, the prior purchases 241 can reveal that the user has previously purchased separately-acquirable supplemental functions that fall within a specific category such as, for example, revealing that the user has previously purchased supplemental functions in the form of additional currency within the context of an online role-playing game. The function intelligence engine 151 can also receive information from specific, relevant portions of a user's demographics 242, such as, for example, whether the user is an adult or a minor, whether the user is male or female, the age of the user, their geographic location, and other like demographic information. As indicated previously, and as with the user-specific information obtained from the game 161, access to the user profile 210, and the obtaining of information therefrom, is conditioned upon explicit user authorization so as to respect the user's right to privacy.

As indicated previously, the function intelligence engine 151 can generate the user-tailored option 251, and present it to the user to aid the user's acquisition of supplemental application functions. In generating the user-tailored option 251, according to one aspect, the function intelligence engine 151 can determine whether to offer, to the user, to purchase a supplemental function, or whether to offer, to the user, the option of obtaining such a supplemental function for free in exchange for viewing advertisements. Consequently, in addition to the above described information, function intelligence engine 151 can also obtain information from one or more advertisements, such as exemplary advertisements 171, that could be presented to a user, and which would result, either directly or indirectly, in payments from an advertiser to a developer or author of an application program in whose context such advertisements were shown to users. More specifically, advertisements, such as exemplary advertisements 171, can have associated therewith advertisement metadata, such as exemplary advertisement metadata 172. The advertisement metadata 172 can include information regarding one or more targets 231 to which the advertisement is targeted. For example, the target 231 can indicate that the advertisement is being targeted to males between the ages of eighteen and thirty-five. As another example, the target 231 can indicate that the advertisement is being targeted to adults during a specific time of day, such as dinnertime. Also part of the advertisement metadata 172 can be information regarding a value 232 associated with the advertisement. For example, the value 232 can indicate an amount that will be earned by the developer of the game 161 if the advertisement 171 is displayed to users of the game 161. As another example, the value 232 can indicate various amounts that will be earned by the developer of the game 161 depending upon the conditions under which the advertisement 171 is displayed to users of the game 161, or, as another example, depending upon the user's response to such an advertisement. Still other metadata 172 can include information regarding a product or service 233 to which the advertisement is directed. Such information can include general categorizations, such as automobiles, or personal hygiene products, and can include specific advertised products or services.

Based upon the information obtained, function intelligence engine 151 can generate the user-tailored option 251 that can be specific to a particular user interacting with the application program, and can be specific to the particular context of such a user within such an application program. For example, the function intelligence engine 151 can determine, based on the player status 226, that the user of the game 161 is likely to fail to advance beyond the level on which the user is currently playing. Continuing with such an example, the function intelligence engine 151 can further determine, based on the player context 227, that the user of the game 161 has previously failed to advance beyond such a level. Based on the functions 222, the function intelligence engine 151 can further identify a specific supplemental function, such as a specific power, or a specific implement, that, within the context of the game 161, can aid the user in advancing beyond the level on which the user currently seems to be stuck. Furthermore, continuing with such an example, the function intelligence engine can determine, such as based on the prior purchases 241, that the user has never purchased separately-acquirable supplemental functions. Consequently, the function intelligence engine 151 can determine that, while the user may be interested in the supplemental function that will aid them in advancing beyond the level on which they currently seem to be stuck, the user will not likely purchase such a supplemental function. Consequently, the function intelligence engine 151 can generate, and subsequently present to the user, the user-tailored option 251 that identifies the supplemental function and its potential benefit to the user, and offer such a supplemental function in exchange for the user consuming advertising, such as viewing one or more of the ads 171. In such a manner, the function intelligence engine 151 can improve the usability and user adoption of such supplemental functions, while simultaneously increasing revenue to the application author, including advertising revenue and purchase revenue.

According to one aspect, the function intelligence engine 151 can utilize machine learning, statistical analysis, heuristic analysis, regression analysis, and other analytic algorithms and mechanisms to identify various factors, and assign weights to those factors, from which the function intelligence engine 151 can identify a specific function-obtaining option to present to the user at a specific time. For example, information regarding the prior purchases 241 can be found, by the function intelligence engine 151, utilizing the above mechanisms, to have a strong correlation to a user's willingness to subsequently purchase supplemental application functions. Consequently, prior purchases can be identified as a factor that can be assigned a value such as, for example, a value indicative of a quantity of prior purchases, or a value indicative of an aggregate monetary amount of prior purchases. Additionally, such a value can be assigned a weight that is indicative of the strong correlation between such prior purchases 241 and the user's willingness to subsequently purchase supplemental application functions. As another example, the status 226 of the player of the game 161, in combination with information regarding the functions 222 that the game 161 offers, such as for supplemental acquisition, can have a strong correlation to subsequent user purchases of supplemental functions if the status 226 indicates that the user is repeatedly failing on a specific portion of the game 161 and the functions 222 indicate a high likelihood that one of those functions would aid the user and prevent future such failures.

As will be recognized by those skilled in the art, machine learning and other like analysis can be based on observed deviations between expected results and actual results, with such deviations being utilized to further tune the system. Consequently, according to one aspect, the function intelligence engine 151 can communicate with other function intelligence engines, or a centralized function intelligence engine to facilitate such tuning and identification of factors and weights to be assigned thereto. Alternatively, or in addition, factors and weights based on other users' behavior can be utilized to provide an initial baseline, with subsequent interaction between the function intelligence engine 151 and a specific user resulting in further tuning, for that specific user, of the factors and weights considered, by the function intelligence engine 151, in generating the user-specific function-obtaining options 251.

In determining which options to present to a user, function intelligence engine 151 can compare a benefit to be received by the application program author if the user were to purchase a supplemental function with a benefit to be received by the application program author if the user were to view advertising in order to receive supplemental function. The function intelligence engine 151 can then further take into account expected probabilities of that user purchasing supplemental function and the expected probabilities of that user consuming advertising to receive the supplemental function, with such probabilities being utilized to appropriately weight the benefits received by the application program author in order to determine an optimal option to present to user. By way of a simple example, the function intelligence engine 151 can identify a supplemental function that a user can purchase for $1.99, but can determine that the expected probability of the user actually purchasing such a supplemental function is only 10%. Continuing with such a simple example, the function intelligence engine 151 can further determine that there is an expected 50% probability that such a user would view an advertisement in exchange for such a supplemental function. In such a simple example, in aggregate, the application author can receive more income if the user is offered, by the function intelligence engine 151, a user-tailored option 251 by which the user can receive the supplemental function in exchange for viewing advertising so long as the value that the application author will receive from the advertiser is greater than $0.40. Furthermore, because the function intelligence engine 151 can generate the user-tailored option 251 that can take into account expected behavior of the user, such as based on the inputs described in detail above, the function intelligence engine 151 can improve the usability and accessibility of supplemental application functions to the users of those applications.

Figure 3:
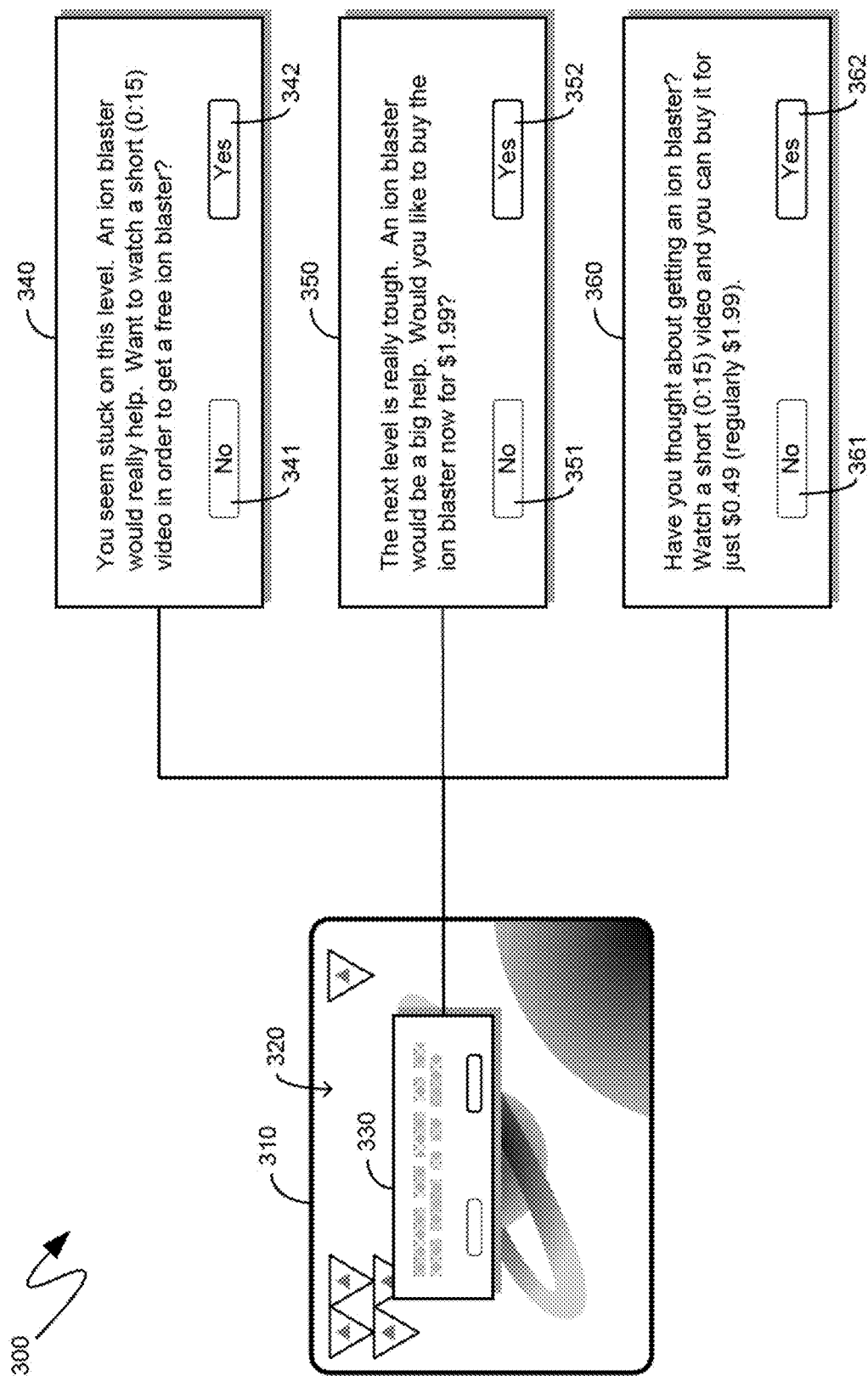
FIG. 3 is a block diagram illustrating exemplary user presentations of options by which a user can acquire separately purchasable application functions.

Turning to FIG. 3, the system 300 shown therein illustrates exemplary user interface notifications and presentations of options that are tailored to the user and help to improve usability and accessibility of supplemental application functions. An exemplary user interface 310 is illustrated comprising a user notification 330 being presented within the context of, and overlaid on top of, an application user interface, such as the exemplary game interface 320 shown in FIG. 3. The exemplary user notification 330 can provide user tailored options by which a user can obtain supplemental functions of the application with which the user is currently interacting. One example of such a user notification is the illustrated exemplary user notification 340, which can convey, to the user, information indicative of the supplemental function being offered to the user, as well as an indication that such a supplemental function can be helpful given the user's current context within the application program. Additionally, the exemplary user notification 340 can convey a price at which the supplemental function is being made available, or other condition on which the supplemental function is being made available such as, for example, in the specific exemplary user notification 340, the offered supplemental function, namely an "ion blaster" is being offered in exchange for the user's consumption of a video advertisement.

Another exemplary user notification 350 illustrates an alternative aspect in which the exemplary user notification 350 can convey, not that the supplemental function being offered is relevant to the user's current context, but rather that the supplemental function being offered can be of use to the user in the future, given the expected user progression through the application program, such as, for example, an application program that comprises multiple sequential levels. As with the exemplary user notification 340, the exemplary user notification 350 can convey to the user the supplemental function that is being offered, as well as a cost for such a supplemental function. In the specific exemplary user notification 350, unlike the exemplary user notification 340, the user is offered the opportunity to purchase the supplemental function, as opposed to consuming advertising in exchange for the supplemental function. As detailed above, whether a user is offered to purchase a supplemental function or to consume advertising in exchange therefor can be tailored to a specific user, and a specific context of that user within the application program itself. Consequently, the same user could receive a notification equivalent to that of the exemplary user notification 340 at one point in time and could receive a notification equivalent to that of the exemplary user notification 350 at a different point in time.

The exemplary user notification 360 illustrates an exemplary user notification in which the user is offered to acquire a supplemental function based on a combination of a consumption of advertising and a payment of monetary value. For example, as illustrated by the specific exemplary user notification 360, the user can be informed that a specific supplemental function can typically be purchased for one price, but is being offered to the user for a lower price should the user choose to view an advertising video.

The exemplary user notifications can further comprise user selectable options by which the user can accept or reject the offers being made such as, for example, the user selectable options 341 and 342 in the exemplary user interface 340, the user selectable options 351 and 352 in the exemplary user interface 350, and the user selectable options 361 and 362 in the exemplary user interface 360. Although not specifically illustrated in FIG. 3, the generated user notifications can further comprise mechanisms by which users can provide more meaningful feedback, such as, for example, feedback indicating that the user is not currently interested in acquiring the supplemental function, but may be interested in acquiring it at a later time, feedback indicating that the user would rather consume advertising rather than purchase the supplemental function, or vice versa, feedback requesting that additional notifications not be generated, or be generated only in specific instances, and other like user feedback conveyance options.

Figure 4:
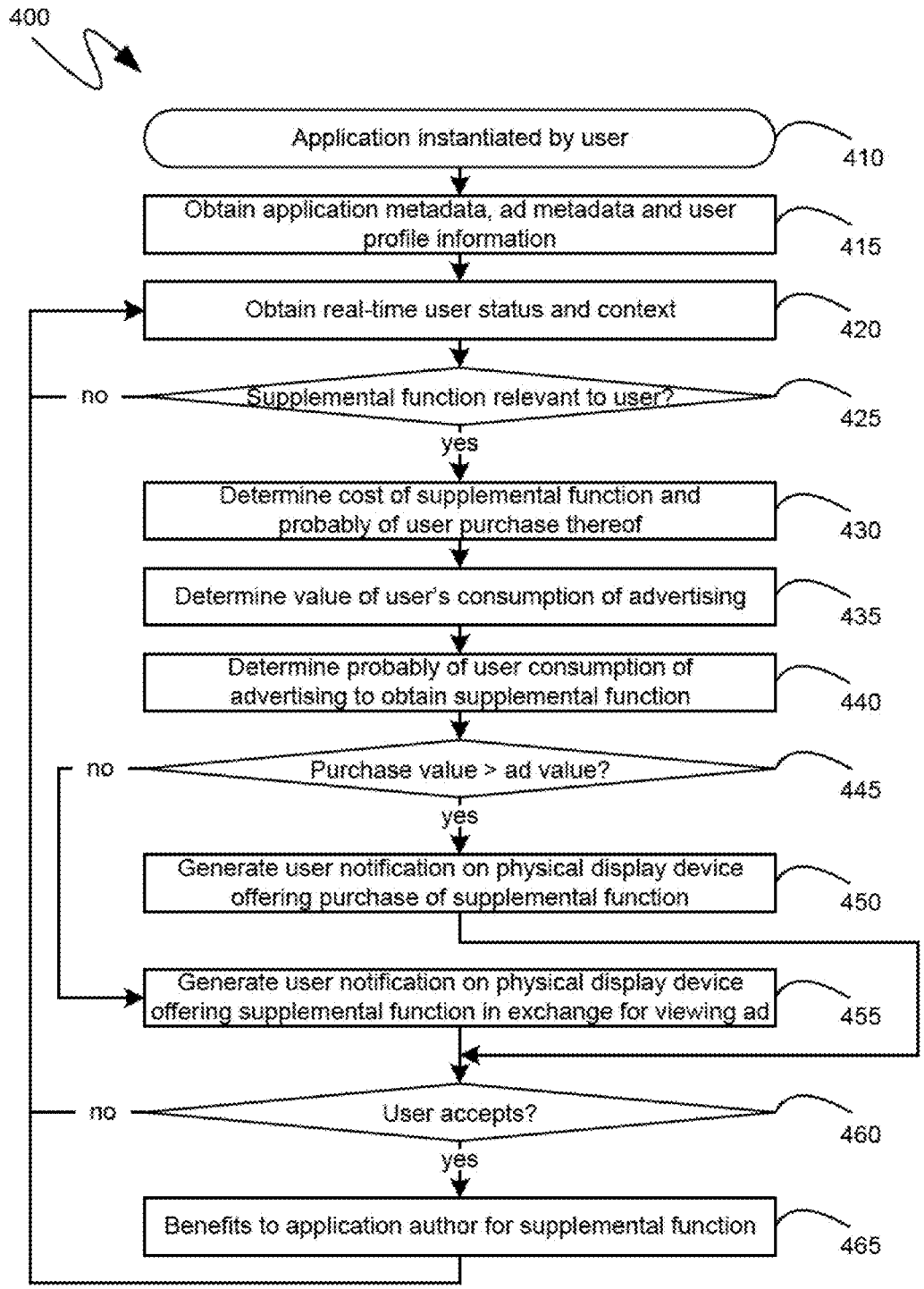
FIG. 4 is a flow diagram of mechanisms by which the usability of separately purchasable application functions can be improved by dynamically modifying the user presented options for obtaining such functions.

Turning to FIG. 4, exemplary flow diagram 400 shown therein illustrates an exemplary series of steps by which user accessibility and usability of supplemental application functions can be improved while simultaneously improving the benefits accruing to an application author for such an application. Initially, as illustrated at step 410, an application can be instantiated by a user and the user can interact with such an application. Subsequently, at step 415, information that is not specific to the user's current interaction with such an application can be received. As illustrated by step 415, such information can include application metadata, advertisement metadata, information from a user profile, and like information as detailed above. As the user continues to interact with the application, at step 420, user status and context information can be obtained from the application program in real-time or proximately thereto. Based on the information received at steps 415 and 420, a determination can be made, at step 425, as to whether a supplemental function of the application program that was instantiated at step 410, that is separately-acquirable, is relevant to the user or should be offered to the user. If the determination, at step 425, reveals that no supplemental function is currently relevant to the user, processing can return to step 420. Conversely, if, at step 425, it is determined that one or more supplemental functions may be relevant to the user, given the user's current context, processing can proceed to step 430.

At step 430, the benefits accruing to an application author from the user's purchase of such a supplemental function can be determined, as can the probability that the user will purchase such a supplemental function. At step 435, benefits accruing to the application author from the user's consumption of advertising can be determined. As indicated previously, such a value can vary depending upon factors identified by the advertiser including, for example, whether the advertisement was targeted to the user, whether the user ultimately purchases the advertised product or service, and other like factors. The probability of those factors, including whether the user would be willing to consume such an advertisement in the first place in order to receive supplemental function, can be determined at step 440 and, at step 450, the probabilistic value, as perceived by the application author, of the user's purchase of the supplemental function can be compared with the probabilistic value, as perceived by the application author, of the user's receipt of the supplemental function in exchange for the consumption of advertising. If, at step 445, it is determined that the probabilistic value, as perceived by the application author, of the user's purchase of the supplemental function is greater, processing can proceed to step 450 and the user notification can be generated within the context of the application program offering the user the opportunity to purchase the supplemental function. Conversely, if the alternative determination is made at step 445, processing can proceed to step 455, at which point the user notification can be generated within the context of the application program offering the user the opportunity to obtain the supplemental function in exchange for the consumption of advertising. As utilized herein, the term "probabilistic value" means the value of an event occurring multiplied by the probability that such an event will occur.

At step 460, if the user accepts the offers that were made, at either step 450, or step 455, the application author can be provided the relevant benefits, at step 465. As indicated previously, the benefits accruing to the application author can include monetary benefits received, either directly or indirectly, from the user based upon the user's purchase of the supplemental function, as well as monetary benefits that are received, and again either directly or indirectly, from an advertiser as compensation for displaying the advertiser's advertisement to the user of the application program. Processing can then return to step 420, which can, according to one aspect, be performed so long as the application remains instantiated by the user. If, at step 460, the user did not accept the offers that were presented, such as at steps 450 or 455, processing can then return to step 420. As will be recognized by those skilled in the art, not all of the steps of the exemplary flow diagram 400 of FIG. 4 need be performed by the same set of computer executable instructions, and their inclusion in the flow diagram is for the sake of completeness, as opposed to an indication of process boundaries.

Figure 5:
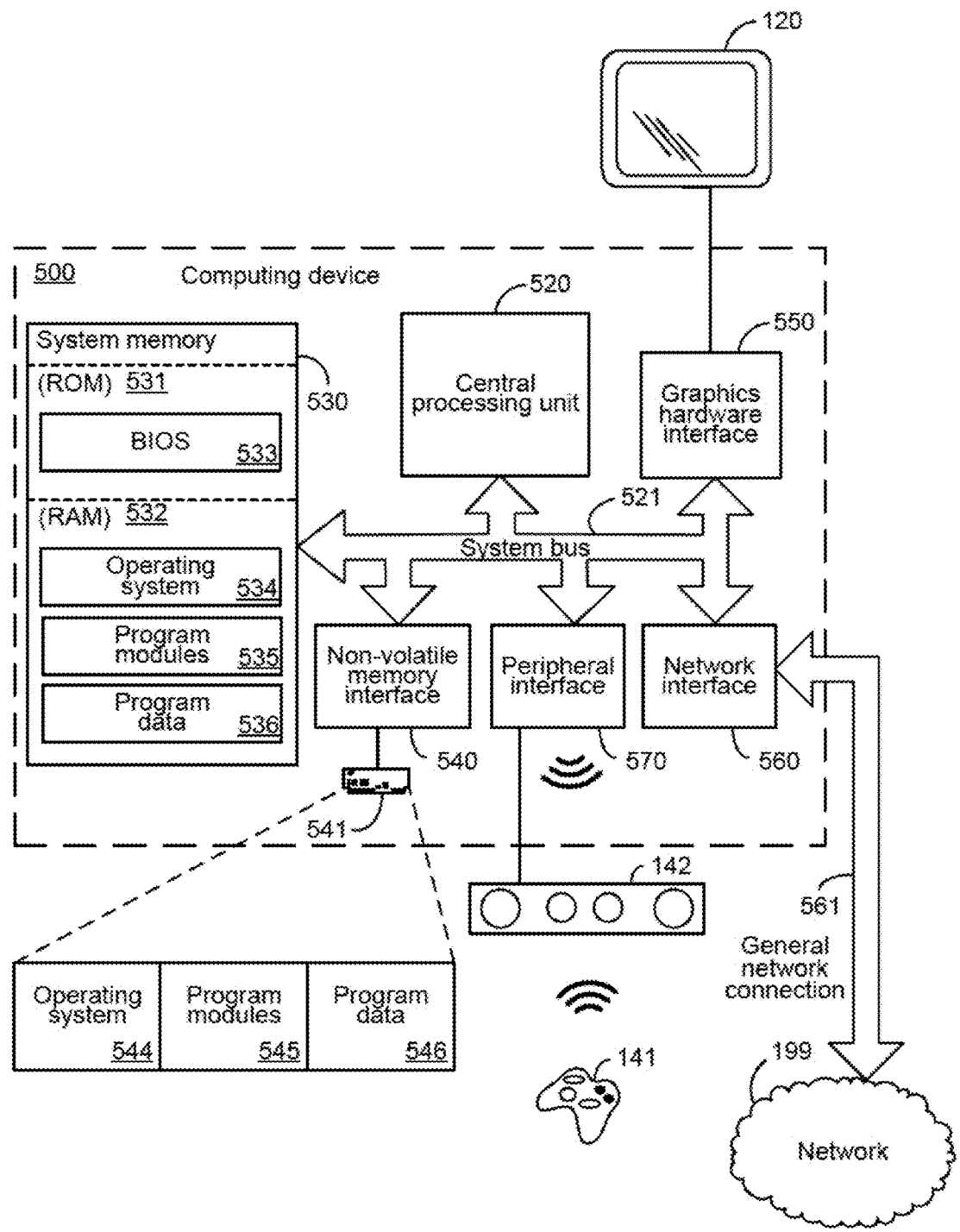
FIG. 5 is a block diagram of an exemplary computing device.

Turning to FIG. 5, an exemplary content presentation device 500 is illustrated which can perform some or all of the mechanisms and actions described above. The exemplary content presentation device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. The content presentation device 500 can include graphics hardware, including, but not limited to, a graphics hardware interface 550 and the display device 120, described previously. Depending on the specific physical implementation, one or more of the CPUs 520, the system memory 530 and other components of the content presentation device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The content presentation device 500 also typically includes computer readable media, which can include any available media that can be accessed by content presentation device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the content presentation device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within content presentation device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The content presentation device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary content presentation device include, but are not limited to, magnetic tape cassettes, flash memory cards, digital versatile disks, digital video tape, solid state RAM, solid state ROM, and the like. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the content presentation device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The content presentation device 500 may operate in a networked environment using logical connections to one or more remote computers. The content presentation device 500 is illustrated as being connected to the general network connection 561 through a network interface or adapter 560, which is, in turn, connected to the system bus 521. In a networked environment, program modules depicted relative to the content presentation device 500, or portions or peripherals thereof, may be stored in the memory of one or more computing devices that are communicatively coupled to the content presentation device 500 through the general network connection 561. For example, at least some of the program models 545 and program data 546 can be stored on computer-readable storage media remote from the content presentation device 500 and accessible by the content presentation device 500 over the network 199 via the general network connection 561 shown in FIG. 5. In such an instance, the relevant portions of the program modules 545 and/or program data 546 can be streamed or otherwise communicated in real-time or in pseudo-real-time to the content presentation device 500 to be executed and/or utilized thereby in the same manner as if such program modules 545 and/or program data 546 were stored on a local storage device of the content presentation device 500, such as, for example, the hard disk drive 541. It will be appreciated that the network connections shown are exemplary and other means of establishing a communications link between computing devices may be used.

Additionally, the content presentation device 500 can also include, or communicate with, user interface and input peripherals, including, but not limited to the game controller 141 and the audio/video input device 142 that were described previously with reference to FIG. 1. Other types of input peripherals can equally be utilized, including more traditional computing device input peripherals, such as a keyboard, a trackpad, or a mouse. The display 120 can, itself, be an input peripheral capable of receiving touch-based user input, such as a touch-sensitive, or multi-touch capable, display device. Such input peripherals can be communicationally coupled to the system bus 521 via a peripheral interface 570. Such communicational couplings can be wired, as exemplarily illustrated in FIG. 5 with the wired connection between the peripheral interface 570 and the audio/video input device 142, or they can be wireless, as exemplarily illustrated in FIG. 5 with the wireless connection between the peripheral interface 570 and the game controller 141.

Although described as a single physical device, the exemplary computing device 500 can be a virtual content presentation device, in which case the functionality of the above-described physical components, such as the CPU 520, the system memory 530, the network interface 560, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "content presentation device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device for improving usability of supplemental functions, the computing device comprising: one or more processing units; a graphics hardware interface communicationally coupling the computing device to a physical display device such that computer-executable instructions being executed by the one or more processing units cause physical changes to the physical display device, thereby generating display content on the physical display device; an application program; and a function intelligence engine, different and independent from the application program, the function intelligence engine comprising computer-executable instructions which, when executed by at least some of the one or more processing units, cause the computing device to perform steps comprising: obtaining a current context, within the application program, of a user's utilization of the application program on the computing device; generating a user-tailored option, specific to the user and based on the obtained current context, for acquiring a supplemental function of the application program, the user-tailored option being at least one of a purchase or a viewing of an advertisement; and causing a user notification to be physically generated on a physical display device communicationally coupled to the computing device, the user notification offering the generated user-tailored option for the user to acquire the supplemental function.

A second example is the computing device of the first example, wherein the computer-executable instructions directed to generating the user-tailored option comprise computer-executable instructions for: determining a probabilistic value of the user purchasing the supplemental function based upon a purchase price for the supplemental function and a determined probability that the user will choose to purchase the supplemental function; determining a probabilistic value of the user viewing the advertisement based upon an amount earned by a developer of the application program for the user's viewing of the advertisement and a determined probability that the user will choose to view the advertisement; and comparing the determined probabilistic value of the user purchasing the supplemental function to the determined probabilistic value of the user viewing the advertisement, the user-tailored option being generated based on the comparing.

A third example is the computing device of the second example, wherein the function intelligence engine further comprises computer-executable instructions for obtaining information indicative of prior acquisitions, by the user, of supplemental functions of other application programs; and wherein further the determined probability that the user will choose to purchase the supplemental function and the determined probability that the user will choose to view the advertisement are determined based at least in part on the obtained information indicative of prior acquisitions of the supplemental functions of the other application programs.

A fourth example is the computing device of the second example, wherein the function intelligence engine further comprises computer-executable instructions for obtaining application metadata identifying a content of the application program; and wherein further the determined probability that the user will choose to purchase the supplemental function and the determined probability that the user will choose to view the advertisement are determined based at least in part on the obtained content of the application program as compared with the obtained current context of the user.

A fifth example is the computing device of the fourth example, wherein the application program is a computer-implemented game and wherein further the obtained application metadata identifies levels of the game.

A sixth example is the computing device of the fourth example, wherein the function intelligence engine further comprises computer-executable instructions for identifying the supplemental function as aiding the user within the obtained current context of the user, the identifying being based at least in part on the obtained content of the application program as compared with the obtained current context of the user; and wherein further the determined probability that the user will choose to purchase the supplemental function and the determined probability that the user will choose to view the advertisement are determined based at least in part on the identifying the supplemental function as aiding the user.

A seventh example is the computing device of the second example, wherein the function intelligence engine further comprises computer-executable instructions for obtaining advertisement metadata identifying targets for the advertisement and wherein further the amount earned by the developer for the user's viewing of the advertisement is determined based upon the user being a target of the advertisement as identified by the obtained advertisement metadata.

An eighth example is the computing device of the seventh example, wherein the user being a target of the advertisement is determined based upon the user's utilization of the application program on the computing device.

A ninth example is a method for improving usability of supplemental functions, the method comprising the steps of: obtaining, on a computing device, a current context, within an application program executing on the computing device, of a user's utilization of the application program on the computing device; generating a user-tailored option, specific to the user and based on the obtained current context, for acquiring a supplemental function of the application program, the user-tailored option being at least one of a purchase or a viewing of an advertisement; and causing a user notification to be physically generated on a physical display device communicationally coupled to the computing device, the user notification offering the generated user-tailored option for the user to acquire the supplemental function.

A tenth example is the method of the ninth example, wherein the generating the user-tailored option comprises: determining a probabilistic value of the user purchasing the supplemental function based upon a purchase price for the supplemental function and a determined probability that the user will choose to purchase the supplemental function; determining a probabilistic value of the user viewing the advertisement based upon an amount earned by a developer of the application program for the user's viewing of the advertisement and a determined probability that the user will choose to view the advertisement; and comparing the determined probabilistic value of the user purchasing the supplemental function to the determined probabilistic value of the user viewing the advertisement, the user-tailored option being generated based on the comparing.

An eleventh example is the method of the tenth example, further comprising the steps of: obtaining information indicative of prior acquisitions, by the user, of supplemental functions of other application programs; wherein the determined probability that the user will choose to purchase the supplemental function and the determined probability that the user will choose to view the advertisement are determined based at least in part on the obtained information indicative of prior acquisitions of the supplemental functions of the other application programs.

A twelfth example is the method of the tenth example, further comprising the steps of: obtaining application metadata identifying a content of the application program; wherein the determined probability that the user will choose to purchase the supplemental function and the determined probability that the user will choose to view the advertisement are determined based at least in part on the obtained content of the application program as compared with the obtained current context of the user.

A thirteenth example is the method of the twelfth example, wherein the application program is a computer-implemented game and wherein further the obtained application metadata identifies levels of the game.

A fourteenth example is the method of the twelfth example, further comprising the steps of: identifying the supplemental function as aiding the user within the obtained current context of the user, the identifying being based at least in part on the obtained content of the application program as compared with the obtained current context of the user; wherein the determined probability that the user will choose to purchase the supplemental function and the determined probability that the user will choose to view the advertisement are determined based at least in part on the identifying the supplemental function as aiding the user.

A fifteenth example is the method of the tenth example, further comprising the steps of: obtaining advertisement metadata identifying targets for the advertisement and wherein further the amount earned by the developer for the user's viewing of the advertisement is determined based upon the user being a target of the advertisement as identified by the obtained advertisement metadata.

A sixteenth example is the method of the fifteenth example, wherein the user being a target of the advertisement is determined based upon the user's utilization of the application program on the computing device.

A seventeenth example is one or more computer-readable storage media comprising computer-executable instructions for improving usability of supplemental functions, the computer-executable instructions, when executed by one or more processing units of a computing device, cause the computing device to perform steps comprising: obtaining a current context, within an application program executing independently of the computer-executable instructions, of a user's utilization of the application program; generating a user-tailored option, specific to the user and based on the obtained current context, for acquiring a supplemental function of the application program, the user-tailored option being at least one of a purchase or a viewing of an advertisement; and transmitting, to the application program, the generated user-tailored option, the application program physically generating, on a physical display device communicationally coupled to the computing device, a user notification offering the generated user-tailored option for the user to acquire the supplemental function.

An eighteenth example is the computer-readable storage media of the seventeenth example, wherein the computer-executable instructions for generating the user-tailored option comprise computer-executable instructions for: determining a probabilistic value of the user purchasing the supplemental function based upon a purchase price for the supplemental function and a determined probability that the user will choose to purchase the supplemental function; determining a probabilistic value of the user viewing the advertisement based upon an amount earned by a developer of the application program for the user's viewing of the advertisement and a determined probability that the user will choose to view the advertisement; and comparing the determined probabilistic value of the user purchasing the supplemental function to the determined probabilistic value of the user viewing the advertisement, the user-tailored option being generated based on the comparing.

A nineteenth example is the computer-readable storage media of the eighteenth example, comprising further computer-executable instructions, which, when executed by the one or more processing units of the computing device, cause the computing device to perform further steps comprising: obtaining information indicative of prior acquisitions, by the user, of supplemental functions of other application programs; wherein the determined probability that the user will choose to purchase the supplemental function and the determined probability that the user will choose to view the advertisement are determined based at least in part on the obtained information indicative of prior acquisitions of the supplemental functions of the other application programs.

A twentieth example is the computer-readable storage media of the eighteenth example, comprising further computer-executable instructions, which, when executed by the one or more processing units of the computing device, cause the computing device to perform further steps comprising: obtaining application metadata identifying a content of the application program; wherein the determined probability that the user will choose to purchase the supplemental function and the determined probability that the user will choose to view the advertisement are determined based at least in part on the obtained content of the application program as compared with the obtained current context of the user.

As can be seen from the above descriptions, mechanisms for improving usability of supplemental application functions through dynamic modification of user-presented options have been presented. In view of the many possible variations of the subject matter described herein, we claim as our invention all such embodiments as may come within the scope of the following claims and equivalents thereto.

We claim:

1. A computing device for improving usability of supplemental functions, the computing device comprising:
   one or more processing units;
   a graphics hardware interface communicationally coupling the computing device to a physical display device such that computer-executable instructions being executed by the one or more processing units cause physical changes to the physical display device, thereby generating display content on the physical display device;
   an application program; and
   a function intelligence engine, different and independent from the application program, the function intelligence engine comprising computer-executable instructions which, when executed by at least some of the one or more processing units, cause the computing device to perform steps comprising:
      obtaining a current application program context, the application program context being created by a user's utilization of the application program on the computing device, the current application program context identifying a transient, user-specific need of the user for a capability within the application program, the transient, user-specific need being based on the current application program context, the capability being provided by a supplemental function of the application program whose accessibility has not been obtained by the user in the current application program context;
      generating a user-tailored option, for acquiring the supplemental function of the application program and activating the supplemental function such that the user can access the supplemental function in the current application program context, the user-tailored option being at least one of a purchase or a viewing of an advertisement; and
      causing a user notification to be physically generated on a physical display device communicationally coupled to the computing device, the user notification offering the generated user-tailored option for the user to acquire the supplemental function.

2. The computing device of claim 1, wherein the computer-executable instructions directed to generating the user-tailored option comprise computer-executable instructions for:
   determining a probabilistic value of the user purchasing the supplemental function based upon a purchase price for the supplemental function and a determined probability that the user will choose to purchase the supplemental function;
   determining a probabilistic value of the user viewing the advertisement based upon an amount earned by a developer of the application program for the user's viewing of the advertisement and a determined probability that the user will choose to view the advertisement; and
   comparing the determined probabilistic value of the user purchasing the supplemental function to the determined probabilistic value of the user viewing the advertisement, the user-tailored option being generated based on the comparing.

3. The computing device of claim 2, wherein the function intelligence engine further comprises computer-executable instructions for obtaining information indicative of prior acquisitions, by the user, of supplemental functions of other application programs; and wherein further the determined probability that the user will choose to purchase the supplemental function and the determined probability that the user will choose to view the advertisement are determined based at least in part on the obtained information indicative of prior acquisitions of the supplemental functions of the other application programs.

4. The computing device of claim 2, wherein the function intelligence engine further comprises computer-executable instructions for obtaining application metadata identifying a content of the application program; and wherein further the determined probability that the user will choose to purchase the supplemental function and the determined probability that the user will choose to view the advertisement are determined based at least in part on the obtained content of the application program as compared with the obtained current application program context.

5. The computing device of claim 4, wherein the application program is a computer-implemented game and wherein further the obtained application metadata identifies levels of the game.

6. The computing device of claim 5, wherein the current application program context identifying the transient, user-specific need of the user for the capability comprises identifying a transient, user-specific need of the user for an ability or a device, within the computer-implemented game, in order to proceed past a current level of the computer-implemented game; and wherein further the current application program context further comprises an identification that the user has previously failed to proceed past the current level.

7. The computing device of claim 2, wherein the function intelligence engine further comprises computer-executable instructions for obtaining advertisement metadata identifying targets for the advertisement and wherein further the amount earned by the developer for the user's viewing of the advertisement is determined based upon the user being a target of the advertisement as identified by the obtained advertisement metadata.

8. The computing device of claim 7, wherein the user being a target of the advertisement is determined based upon the user's utilization of the application program on the computing device.

9. A method for improving usability of supplemental functions, the method comprising the steps of:
  obtaining, on a computing device, a current application program context, the application program context being created by a user's utilization of the application program on the computing device, the current application program context identifying a transient, user-specific need of the user for a capability within the application program, the transient, user-specific need being based on the current application program context, the capability being provided by a supplemental function of the application program whose accessibility has not been obtained by the user in the current application program context;
  generating a user-tailored option, for acquiring the supplemental function of the application program and activating the supplemental function such that the user can access the supplemental function in the current application program context, the user-tailored option being at least one of a purchase or a viewing of an advertisement; and
  causing a user notification to be physically generated on a physical display device communicationally coupled to the computing device, the user notification offering the generated user-tailored option for the user to acquire the supplemental function.

10. The method of claim 9, wherein the generating the user-tailored option comprises:
  determining a probabilistic value of the user purchasing the supplemental function based upon a purchase price for the supplemental function and a determined probability that the user will choose to purchase the supplemental function;
  determining a probabilistic value of the user viewing the advertisement based upon an amount earned by a developer of the application program for the user's viewing of the advertisement and a determined probability that the user will choose to view the advertisement; and
  comparing the determined probabilistic value of the user purchasing the supplemental function to the determined probabilistic value of the user viewing the advertisement, the user-tailored option being generated based on the comparing.

11. The method of claim 10, further comprising the steps of: obtaining information indicative of prior acquisitions, by the user, of supplemental functions of other application programs; wherein the determined probability that the user will choose to purchase the supplemental function and the determined probability that the user will choose to view the advertisement are determined based at least in part on the obtained information indicative of prior acquisitions of the supplemental functions of the other application programs.

12. The method of claim 10, further comprising the steps of:
  obtaining application metadata identifying a content of the application program; wherein the determined probability that the user will choose to purchase the supplemental function and the determined probability that the user will choose to view the advertisement are determined based at least in part on the obtained content of the application program as compared with the obtained current application program context.

13. The method of claim 12, wherein the application program is a computer-implemented game and wherein further the obtained application metadata identifies levels of the game.

14. The method of claim 13, wherein the current application program context identifying the transient, user-specific need of the user for the capability comprises identifying a transient, user-specific need of the user for an ability or a device, within the computer-implemented game, in order to proceed past a current level of the computer-implemented game; and wherein further the current application program context further comprises an identification that the user has previously failed to proceed past the current level.

15. The method of claim 10, further comprising the steps of: obtaining advertisement metadata identifying targets for the advertisement and wherein further the amount earned by the developer for the user's viewing of the advertisement is determined based upon the user being a target of the advertisement as identified by the obtained advertisement metadata.

16. The method of claim 15, wherein the user being a target of the advertisement is determined based upon the user's utilization of the application program on the computing device.

17. One or more computer-readable storage media comprising computer-executable instructions for improving usability of supplemental functions, the computer-executable instructions, when executed by one or more processing units of a computing device, cause the computing device to perform steps comprising:
  obtaining a current application program context, the application program context being created by a user's utilization of the application program, the current application program context identifying a transient, user-specific need of the user for a capability within the application program, the transient, user-specific need being based on the current application program context, the capability being provided by a supplemental function of the application program whose accessibility has not been obtained by the user in the current application program context;
  generating a user-tailored option, for acquiring the supplemental function of the application program and activating the supplemental function such that the user can access the supplemental function in the current application program context of the user's utilization of the application program, the user-tailored option being at least one of a purchase or a viewing of an advertisement; and
  transmitting, to the application program, the generated user-tailored option, the application program physically generating, on a physical display device communicationally coupled to the computing device, a user notification offering the generated user-tailored option for the user to acquire the supplemental function.

18. The computer-readable storage media of claim 17, wherein the computer-executable instructions for generating the user-tailored option comprise computer-executable instructions for:
  determining a probabilistic value of the user purchasing the supplemental function based upon a purchase price for the supplemental function and a determined probability that the user will choose to purchase the supplemental function;

determining a probabilistic value of the user viewing the advertisement based upon an amount earned by a developer of the application program for the user's viewing of the advertisement and a determined probability that the user will choose to view the advertisement; and comparing the determined probabilistic value of the user purchasing the supplemental function to the determined probabilistic value of the user viewing the advertisement, the user-tailored option being generated based on the comparing.

19. The computer-readable storage media of claim 18, comprising further computer-executable instructions, which, when executed by the one or more processing units of the computing device, cause the computing device to perform further steps comprising: obtaining information indicative of prior acquisitions, by the user, of supplemental functions of other application programs; wherein the determined probability that the user will choose to purchase the supplemental function and the determined probability that the user will choose to view the advertisement are determined based at least in part on the obtained information indicative of prior acquisitions of the supplemental functions of the other application programs.

20. The computer-readable storage media of claim 18, comprising further computer-executable instructions, which, when executed by the one or more processing units of the computing device, cause the computing device to perform further steps comprising: obtaining application metadata identifying a content of the application program;

wherein the determined probability that the user will choose to purchase the supplemental function and the determined probability that the user will choose to view the advertisement are determined based at least in part on the obtained content of the application program as compared with the obtained current application program context.

* * * * *